(12) United States Patent
Simske et al.

(10) Patent No.: US 8,943,603 B2
(45) Date of Patent: Jan. 27, 2015

(54) SYSTEM AND METHOD FOR DOCUMENT POLICY ENFORCEMENT

(75) Inventors: Steven J. Simske, Fort Collins, CO (US); Helen Balinsky, Cardiff Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 110 days.

(21) Appl. No.: 13/700,804

(22) PCT Filed: Jul. 8, 2010

(86) PCT No.: PCT/US2010/041383
§ 371 (c)(1),
(2), (4) Date: Nov. 29, 2012

(87) PCT Pub. No.: WO2012/005730
PCT Pub. Date: Jan. 12, 2012

(65) Prior Publication Data
US 2013/0104190 A1    Apr. 25, 2013

(51) Int. Cl.
G06F 21/00    (2013.01)
G06F 21/60    (2013.01)
G06Q 10/10   (2012.01)

(52) U.S. Cl.
CPC ............... *G06F 21/60* (2013.01); *G06Q 10/10* (2013.01)
USPC ................................................. 726/26; 726/1

(58) Field of Classification Search
CPC ... H04L 63/102; H04L 63/105; H04L 62/108; G06F 21/62
USPC ............................................ 726/1, 26, 30, 28
See application file for complete search history.

(56) References Cited

U.S. PATENT DOCUMENTS

2007/0174896 A1*    7/2007    Furuya et al. .................... 726/1

FOREIGN PATENT DOCUMENTS

| KR | 20050060622 | 6/2005 |
| KR | 1020060040975 | 5/2006 |
| KR | 1020070025502 | 3/2007 |

* cited by examiner

*Primary Examiner* — Edward Zee
(74) *Attorney, Agent, or Firm* — Dierker & Assoc.; Julia C. Dierker

(57) ABSTRACT

A system and method is disclosed for document policy enforcement. The method discloses: scanning document parts for a set of policy-eliciting terms; assigning a policy to a document part based on a policy-eliciting term found within the document part; and enforcing the policy. The system discloses a computer programmed with executable instructions which operate a set of modules, wherein the modules comprise: a policy editor and a policy daemon, for effecting the method.

12 Claims, 5 Drawing Sheets

200 Policy Definitions 202

| Policy 204 | Policy-Eliciting Terms (PETs) 206 | User Identifier 208 | Permitted Actions 210 | Denied Actions 212 | Modification Actions 214 | Alerts and Logs 216 |
|---|---|---|---|---|---|---|
| 0 | "Confidential" | 1 | Read; | Edit; Print; Save | Encrypt document; | Log; Warning; |
| 1 | "Confidential" | 2 | Read; Edit; Print; Save | None; | Encrypt document; Secure Printing | Log; |
| 2 | "Restricted" | All Users | Read; Print; Save | Edit | | None; |
| 3 | None | All Users | All; | None; | None; | None; |
| 4 | "Private" (e.g. User-1's Data) | 2 | None; | All; | n/a | Warning; |
| 5 | "Private" (e.g. User-1's Data) | 1 | All; | None; | Secure Printing; | Warning; |

Policy Definitions 202

| Policy 204 | Policy-Eliciting Terms (PETs) 206 | User Identifier 208 | Permitted Actions 210 | Denied Actions 212 | Modification Actions 214 | Alerts and Logs 216 |
|---|---|---|---|---|---|---|
| 0 | "Confidential" | 1 | Read; | Edit; Print; Save | Encrypt document; | Log; Warning; |
| 1 | "Confidential" | 2 | Read; Edit; Print; Save | None; | Encrypt document; Secure Printing | Log; |
| 2 | "Restricted" | All Users | Read; Print; Save | Edit | | None; |
| 3 | None | All Users | All; | None; | None; | None; |
| 4 | "Private" (e.g. User-1's Data) | 2 | None; | All; | n/a | Warning; |
| 5 | "Private" (e.g. User-1's Data) | 1 | All; | None; | Secure Printing; | Warning; |

Fig. 2

Classification Signature 302

| Document Part 304 | Policy Eliciting Terms (PETs) 206 | Policy 204 | |
|---|---|---|---|
| | | User-1 102 | User-2 103 |
| A | "Confidential" | 0 | 1 |
| B | "Restricted" | 2 | 2 |
| C | "Confidential" | 0 | 1 |
| D | "Private" (e.g. User-1's Data) | 5 | 4 |
| E | None | 3 | 3 |

300

SYSTEM AND METHOD FOR DOCUMENT POLICY ENFORCEMENT

BACKGROUND OF THE INVENTION

The present invention relates generally to systems and methods for document policy enforcement.

BRIEF DESCRIPTION OF THE DRAWINGS

Some examples of the invention are described in the following figures:

FIG. 2 is a data structure diagram of one example of a set of policy definitions;

DETAILED DESCRIPTION

Figure 1:
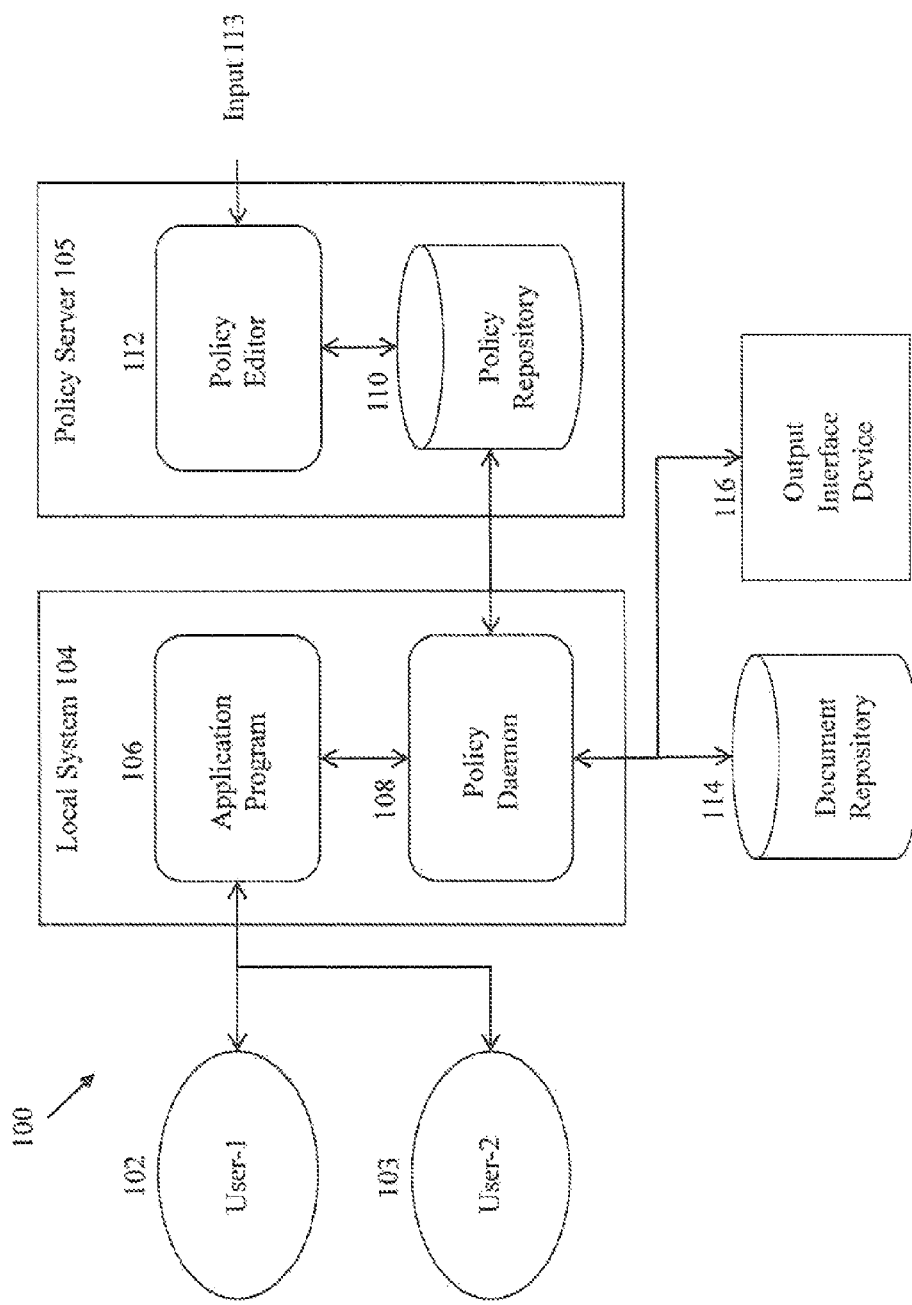
FIG. 1 is one example of a system for which document policy is enforced.

Electronic data communication is ubiquitous. Modern business practices and commerce requires that data be transmitted in a way that adheres to varying levels of security that meets customer, internal business, and legal standards. For example, these standards are intended to help prevent unauthorized reading and removal of printed documents from a secure area, or unauthorized entailing of information and attachments.

To this end, often labels or tags such as "private", "confidential", "restricted", "sensitive", and the like are added to various documents and data transmissions, according to a contractual, company, and/or legal policy.

However, ensuring that such policies are effected is another matter. Differing levels of employee competence (e.g. new to company, job, or role; temporary replacement) can result in such policies being violated. Also, genuine mistakes (e.g. distraction, forgetfulness, lack of concentration), or a lack of up to date corporate, legal, or other policy information can result in information leaks.

Similarly, files stored in Encrypted File Systems (EFSs), whose policies are intended to keep the file secure, can have their security compromised when such files are transmitted (e.g. copied, e-mailed, saved, printed, etc.) to other less secure systems. Pop-up "Warning" messages intended to discourage such transmissions are often ignored, and existing EFS systems are not often configured to prevent such transmissions.

For example, even though EFS files may be protected by associated metadata, and by the fact that the file is stored on an encrypted drive/location, when a user accesses such an EFS file, the file is automatically decrypted. If such an unencrypted file is then saved to an unencrypted USB storage device in clear-text, the file will be even more susceptible to unacceptable dissemination than if someone had just printed it out and left it resting on an office desktop.

Current approaches toward policy enforcement tend to rely on user education, user compliance, auditing, etc.; however, such solutions are a rigid, one-size fits all approach that does not adapt well to the modern dynamic world of electronic business and commerce, where information is often re-purposed again, and again.

What is needed is a solution which can customize policy enforcement to various types of data storage, transmission, and printing environments to ensure that a policy applicable to a set of information is followed, regardless of where that information goes or ends up. A solution is needed where the policy "travels with" the information that the policy is intended to protect.

The present invention addresses and remedies many, if not all, of the problems discussed above.

The present invention employs a content-based automatic policy enforcement system for handling secure, private, confidential and other sensitive documents, Different sets of policies are possible for: printing, editing, routing, archiving, and so on. The policies are readily updatable in response to: new policy introduction; old/obsolete policy deprecation; and changes to various business rules and processes by company management. The policies are enforced throughout the document lifecycle, and thus documents so managed are compliant by design.

This automatic policy enforcement alleviates a variety of "weakest link" security risks, such as wherein individuals least familiar with policy may inadvertently risk company assets. The present invention also helps thwart some insidious insider attacks, since a policy daemon can automatically enforce the policies, and create a full log-audit which can help in determining the route for the information leakage.

Such policy enforcement can be used to help implement DRM (Digital Rights Management) rules, prevent plagiarism, as well as provide an on-ramp for other analytic tools.

Details of the present invention are now discussed.

Figure 3:
FIG. 3 is a data structure diagram of one example of a classification signature.

FIG. 1 is one example of a system 100 for which document policy is enforced. FIG. 2 is a data structure diagram 200 of one example of a set of policy definitions 202. FIG. 3 is a data structure diagram 300 of one example of a classification signature 302, Due to the integrated operation of the system 100 with the data structures 200 and 300, and to facilitate a logical understanding of the present invention, FIGS. 1 through 3 are discussed together.

In one example embodiment of the present invention, a policy editor 112 and a policy repository 110 reside in a policy server 105. The policy editor 112 is responsive to input 113 received either manually from an individual or in an automated form from another program. The policy editor 112 is used to create a customizable set of policy definitions 202 applicable to: a set of user 102 or 103 commands sent to an application program 106 on a local system 104; a set of documents stored in a document repository 114; and with respect to information sent or received from an output interface device 116. The document repository 114 can have many embodiments, including: local or network storage, a hard drive, removable media, and so on.

A "document" is herein defined very broadly to include: text, media, video, audio, files, other documents, labels, tags, elements, phrases, patterns, programs, network data, packet streams, signal transmissions, records, and data of any type.

One example set of policy definitions 202 is shown in the data structure of FIG. 2. The policy definitions 202 are stored in the policy repository 110 in the policy server 105 and include: a set of policies 204; a set of policy-eliciting terms (PETs) 206, which can be single terms, compound terms or combination of terms (any and/or of multiple terms); a set of user identifiers 208; a permitted set of actions 210; a denied set of actions 12; a set of modification action 214, and a set of alerts and logs 16, The policy 204 labels the policy, and in FIG. 2 is labeled as 0 through 5. Any number of policies can be created based on each instantiation of the present invention.

The policy-eliciting terms 206 are defined by the policy editor 112 and can broadly include any set of information, such as: classification levels, security labels, words, paragraphs, pages, symbols, phrases, patterns, data, tags, dates, logos, code, files, documents, and so on that could be found in a document.

Examples of policy-eliciting terms 206 include: Confidential, Restricted, Private, Secure, Confidentiel (French), Privé (French); high-security, medium-security, low-security, level 0, level 1, credit-card numbers, social-security numbers, customer identifiers, a form, a template, workflow-eliciting terms, author, owner, creation date, modification date, and parts of copyrighted works. Additionally, a set of policy-eliciting terms 206 can include: a name/codename of a new product, thus preventing any the new product-related information from being accidentally released; a programming language specific string of characters that can detect/prevent source code unauthorized release (e.g. the following policy-eliciting terms 206 will be contained by any java source code: import public class static void main (String[] args)); or any chunk of plagiarism-indicating text.

The policy-eliciting terms 206, in conjunction with the user identifier 208, determine which policies 204 are applied to: commands sent to an application program 106; one or more parts of the documents in the document repository 114; and information sent or received from an output interface device 116.

The user identifier 208 is assigned to any user, such as user-1 102 or user-2 103, which is accessing the application program 106, retrieving or storing documents to the document repository 114, and/or having document information received or transmitted to the output interface device 116. A "user" is herein defined broadly to include not only individuals, but also computerized or other technology systems (e.g. programs and network services) having functionality capable of interacting with the documents in the document repository 114. The user identifier 208 can also refer to a "class of users" who have been assigned a particular "role" (e.g. authorship, editing, publishing, derivative-works generation, and so on).

Associated with each policy is a permitted set of actions 210, a denied set of actions 212, a set of modification actions 214, and a set of alerts and logs 216. What actions are permitted 210, denied 212, and which modifications 214 required are, in one embodiment, wholly dependent upon the policy 204 defined by the policy editor 112. In other embodiments, the permitted 210, denied 212, and modification 214 actions might be required to conform to a contractual or legal obligation.

Actions that are permitted 210 for one user specified by the user identifier 208, and one part 304 of the document, may or may not be permitted for another user. Similarly, modification actions 214 for one user of one document, may or may not be the same for another user. There is great flexibility in assigning the permitted 210, denied 212, and modification 214 actions.

Examples of permitted 210 and denied 212 actions, for various parts 304 of the document, include user rights to: create, access, open, read, edit, copy, duplicate, save, export, print, e-mail, and etc. More complex permitted 210 and denied 212 actions can include rules such as: private documents cannot be printed without a secure code being entered at the printer; document parts 304 having a high security level must be encrypted when saved; clear-text e-mailing of a sensitive document is not permitted; confidential documents can not be e-mailed to non-enterprise addresses; only five copies of a document can be printed by user-1 102; policies which take into account a document's source, destination, and other associated meta-data (e.g. creator, owner, access date, etc) are also possible; and so on.

While the permitted 210 and denied 212 actions operate in a more passive, gate-keeping role, the set of modification actions 214 operates in more a active, ongoing maintenance role, ensuring that certain policy actions are followed even for permitted 210 actions. Some examples include: certain protection enforcing actions, mandatory document encryption, redirection to a secure printer, etc.

In one example, discussing all three types of actions 210, 212, and 214, the user 102 sends an application 106 a command to print a document A on a printer B. The policy daemon 108 (to be discussed in more detail below) detects (e.g. monitors, captures, listens to) the user's 102 print command, and applies the appropriate policy definitions 202. In this example, the accompanying policy definitions 202 can include: denying the print command, forbidding the printing of document A (i.e. a denied action 212); allowing document A to be printed on printer B (i.e. a permitted action 210); or performing a modification action 214 such that only certain parts 304 of document A are sent to printer B, while other more secure parts are sent only to another (secure) printer.

The alerts and logs 216 can be generated not only for the user's 102 and 103 benefit (e.g. remind the user that the document shall never be taken out of the office), but also to supply analytics (not shown) with data to track the progression of various document information through a workflow, or a business process. Special alerts and logs 216 can be generated if the user adds policy-eliciting terms 206 which either "increase" or "decrease" all or part 304 of a document's security level, perhaps so that certain documents, or parts thereof, do not contain terms beyond a predetermined security level (otherwise a new policy is germane and is applied), or so that a key policy-eliciting term 206 is not deleted without verifying that further deletions in the body of a document also occur (e.g. such as when the label "Confidential" is removed from a document "header", but the document still contains "Confidential" information).

Within the system 100, the policy daemon 108 detects and applies the policies 204 to command request and data transmitted from the users 102 and 103, the application program 106, the document repository 114, and the output interface device 116. The policy daemon 108 thus ensures that the policies 204 on the policy server 105 are detected, applied and enforced.

While FIG. 1 only shows one local system 104, having an application program 106 and a policy daemon 108, in other embodiments the policy server 105 is coupled to several local systems 104, each having their own instances of the application program 106 and policy daemon 108. One example of such a multi-local system 104 embodiment could be where the local system 104 is a handheld device, such as a mobile phone, or one of may laptop or desktop computers on a network. In such distributed embodiments, the policy daemon 108 would synchronize with the policy repository 110 on a schedule or as needed.

The policy daemon 108 is programmed to scan and perform deep content parsing of a set of predetermined structured and/or unstructured fields within the document (e.g. the policy daemon 108 looks inside the document and unravels the document's content) for policy-eliciting terms 206 at a periodic time interval, or asynchronously in response to a document event (e.g. when an application 106 command is received by the daemon 108 that has a potential for releasing information outside of a document's current secure environment and/or releasing information to an unauthorized party).

In other words, the policy daemon 108, in one example embodiment, listens to what the application program 106 is trying to do (i.e. what system calls it makes), and if the application program 106 tries to effect any action that the policy daemon 108 is programmed to detect, then the policy daemon 108 captures (e.g. intercepts) the request and injects a new set of code (e.g. applies the policy 204) according to the policy definitions 202. For example, if the application program 106 generates a system call to send a document to a printer, then the policy daemon 108 captures the "send request" and holds it. Then the policy daemon 108 evaluates the document and the printer, and depending on the evaluation results, the policy daemon either sends the document to the printer or not.

Embodiments of the policy daemon 108 can be implemented without requiring any modification to the application program 106 used to create, view, edit, print, and otherwise interface with the document.

In certain embodiments, the policy daemon 108 need not find the "exact" policy-eliciting terms 206 specified by the policy editor 112 in the policy definitions 202. Instead "statistical language processing" (SLP) techniques (e.g. a "Damerau-Levenshtein distance" or just a "Levenshtein distance") are used to apply a "fuzzy matching" logic to search for the policy-eliciting terms 206. Such "fuzzy matching" accommodates errors such as misspellings (e.g. Private=PriVate=Prvate=Privaty=Pivate and other errors such as a missing letter 'i' wrong letter: 'e' replaced 'y' swapped letters: 'r' and 'i').

In some embodiments, the events prompting a deep contents document scan and parsing can be generally classified into either "Document Changing Events" or "Document Handling Events". Some "Document Changing Events" can include, when the document is: created, edited, modified. Some "Document Handling Events" can include when the document is: opened, copied, pasted, saved, archived, deleted, transmitted, exported, printed, burned to DVD, or backed-up. Other document lifecycle events are possible as well. In one embodiment, the document is progressively scanned in near real-time as the user edits the document (i.e. similar to a document "auto-save" function). This embodiment has a relatively low computational overhead as the user slowly revises/edits the document through typing, copying, inserting, etc.

Document events can also include detection of: a new user requesting access to the document; a new record being added to the document; a request to audit the document; edits to the policy definitions 202 in the policy repository 110 by the policy editor 112; and so on.

Thus, when the policy editor 112 updates the policy definitions 202 for one or more documents or parts thereof, the policy daemon 108 is automatically triggered to perform a scan so that the new policy definitions 202 are identified and enforced.

The scanned structured and/or unstructured fields can include: all or part of the document, the document header and/or footer, the document body, metadata associated with the document, certain pages, slides or tables in the document, as well as any other part of the document.

In one embodiment, the policy daemon 108 may be programmed to interpret the document as a completely integrated whole and thereby assign a single user and action dependent policy 204 to the entire document based on an aggregated set of policy-eliciting terms 206 found therein. For example, the policy daemon 108 can be programmed to assign policies 204 "0" (for user-1 102) and "1" (for user-2 103) to the entire document if the policy-eliciting term 206 "Confidential" is found in any of the document's headers or footers.

However, in another embodiment, the policy daemon 108 may be programmed to interpret the document as a composite document having a set of parts 304 and thereby assign different policies 204 to the different parts 304 of the document based on the policy-eliciting terms 206 found in each part of the composite document. A "composite document" is herein defined to include: a document that been repartitioned into parts (i.e. sub-sets or sub-portions) of any size; and a document which was created from an amalgam of data sources (e.g. one source being a starting template/boilerplate, another source being data from user-1 102, another source being copyrighted data from a third-party web-site, and another source being data from "Confidential" report).

This set of policies 204 associated with the different parts 304 of the composite document is called a classification signature 302, an example of which is shown in FIG. 3. The classification signature 302 is a type of mapfile which identifies which of the policies 204 apply to various parts 304 of the composite document.

In the example embodiment of the classification signature 302 shown in FIG. 3, the policy daemon 108 has interpreted the document as being comprised of parts 304 "A" through "E". After performing a. scan, the policy daemon 108 has determined that the policy-eliciting term 206 "Confidential" appears in parts "A" and "C". The policy daemon 108 looks-up the policy-eliciting term 206 "Confidential" in the policy definitions 202 and determines that policy 204 "0" should be applied to user-1 102 and policy 204 "1" should be applied to user-2 103. The policy daemon 108 stores these identified policies in the policy 204 column of the classification signature 302 table next in the "A" and "C" part 304 rows. Similarly, the policy daemon 108 builds up the rest of the classification signature 302 table, in response to the "Restricted" and "Private" policy-eliciting terms 206 found in the document. Even when no policy-eliciting terms 206 are found in a. part "E" of the document, the policy definitions 202 still specify a policy 204 "3".

Upon subsequent scans of the document by the policy daemon 108, if any changes to the policy-eliciting terms 206 in one or more document parts 304 have been detected, then the policy daemon 108 can be programmed to selectively generate a new classification signature 302 or reconfirm the accuracy of an existing classification signature 302. In other words, in some embodiments, the classification signature 302 and policies 204 applied to a document remain valid until the document is either accessed, modified, or exported in particular ways, or until the policy editor 112 changes the policy definitions 202.

For example, (referring first to FIG. 3) if after a scan of the document the policy daemon 108 determines that in part 304 "A" of the document, the policy-eliciting term 206 "Confidential" was deleted and replaced with "Restricted", then (now referring to FIG. 2) the policy daemon 108 "looks-up" the policy-eliciting term 206 "Restricted" in the policy definitions 202 and modifies the classification signature 302 (in FIG. 3) so that policy 204 "2" is now applied to part 304 "A" of the document. Thus, the policy daemon 108 is continually analyzing the document parts 304 for any changes in policy-eliciting terms 206 to determine if a different policy 204 should be applied to said parts 304. Note that another example of this rescan feature could have had a policy 204 which looked for a MD policy-eliciting term 206 in the body, or any other part of the document.

Embodiments of the policy daemon 108 can also include: a performance-favoring embodiment and a storage-favoring embodiment. The performance-favoring embodiment is, in one example context, an on-line document delivery service, with slowly-changing policies. In this context, the content of the document is not changing, so the policy daemon 108 generates and securely caches just one, or a few, classification signatures 302 for the document. This enhances performance, by not rescanning the document for policy-eliciting terms 206 every time certain document events, such as printing or archiving, are requested. Of course, any editorial changes to the document or a change in the policies 204 would trigger a rescan and generation of a new classification signature 302.

In the storage-favoring embodiment, the policy daemon 108 dictates the rescan of the document and generates a new classification signature 302 in response to a greater number of document events, such as upon detecting any action that has a potential to expose/leak sensitive information.

Note that in some embodiments, the classification signature 302 is not cached. or saved, but is re-computed each time a document event is detected.

Many, if not all, of the same asynchronous document events which prompt the policy daemon 108 to perform a. scan of the document, also prompt the policy daemon 108 to enforce apply, effect, execute, etc.) the policies 204 throughout the document lifecycle, so that the documents themselves are policy compliant by design.

Events prompting policy 204 enforcement include when the document is: created, opened, edited (incrementally or otherwise), modified, copied, pasted, saved, archived, deleted, transmitted, exported, printed, burned to DVD, backed-up, sent to or received from an output interface device 116, as well as other events in the document's lifecycle. The output interface device 116 can be any input or output device capable of receiving or transmitting data (e.g. computer code, text, video, audio, and all other types of files). Some example output interface devices 116 include: printers, storage devices, network connections, other computers, etc.

Document events prompting policy 204 enforcement can also include detection of: a new user requesting access to the document, a new record being added to the document, a request to audit the document, and so on.

The policy daemon 108 then applies and enforces the policies 204 (i.e. the permitted actions 210, the denied actions 212, the modification actions 214, and the alerts and logs 216) in the policy definitions 202 based on which user 102 or 103 is interfacing with which part 304 of the document as specified in the classification signature 302.

Additionally, when the policy daemon 108 uses the classification signature 302 to enforce different policies 204 depending upon "which of the users 102 or 103" is interfacing with the document, this is herein defined as differential access. For example, if user-1 102 attempts to export the document out of the document repository 114 to the output interface device 116 (e.g. to print the document, copied the document to a storage device, bum the document to a CD or DVD, and so on), the policy daemon 108 accesses the document's classification signature 302 and applies those policies 204 applicable to user-1 102. Thus, depending upon the policy-eliciting terms 206 associated with different parts 304 of the document, user-1 102 may or may not be able to export the entire document out of the document repository 114. Instead user-1 102 may only be allowed to export only certain parts 304 of the document.

Figure 4:
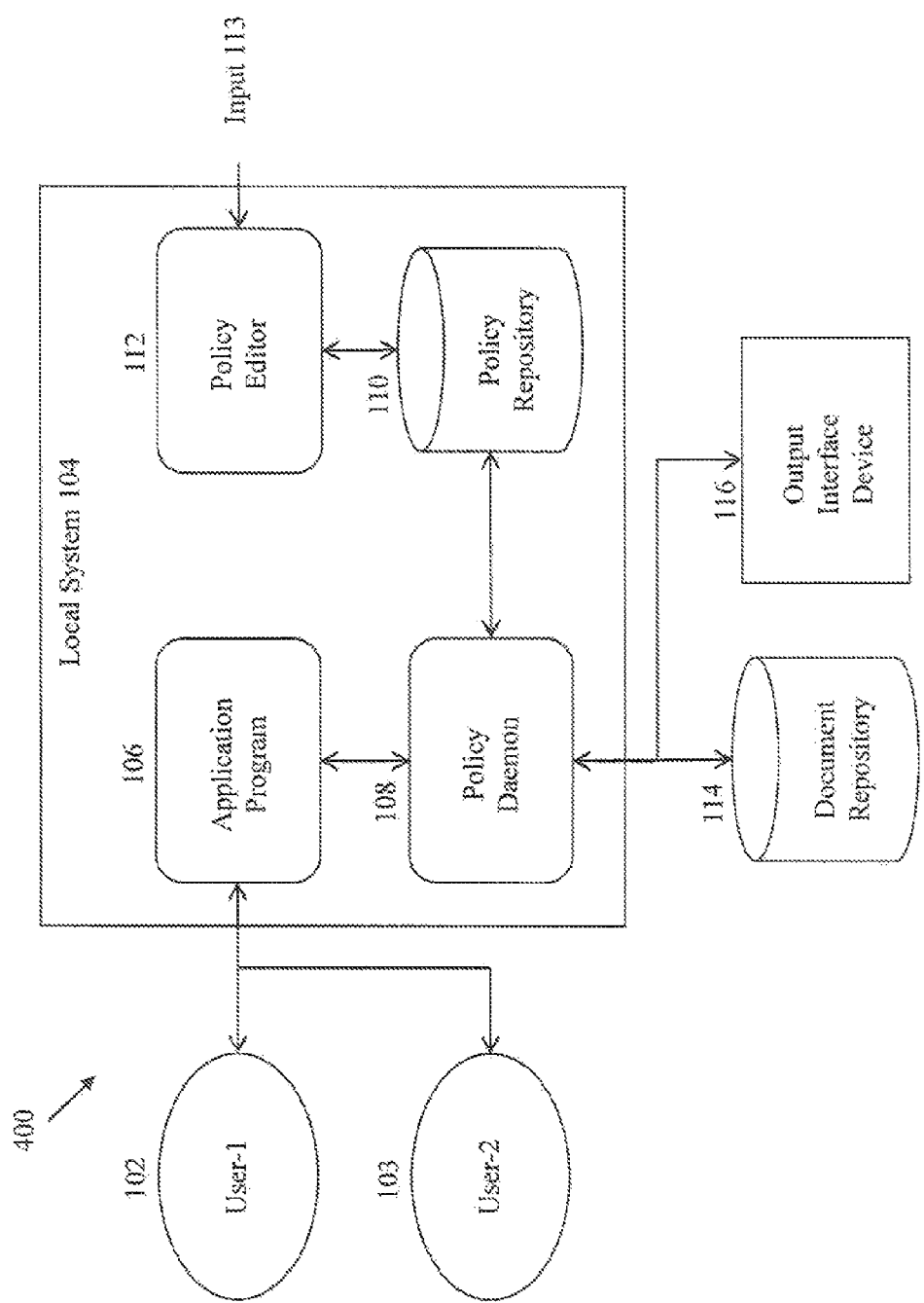
FIG. 4 is a second example of a system for which document policy is enforced.

FIG. 4 is a second example of a system 400 for which document policy is enforced. This second system 400 differs from the first system 100, only in that the policy repository 110 and the policy editor 112 are now located on the local system 104. Such an embodiment may perhaps have greater use in either very computationally powerful computer systems or in computer systems not network connected (or lacking the sufficient network bandwidth).

Figure 5:
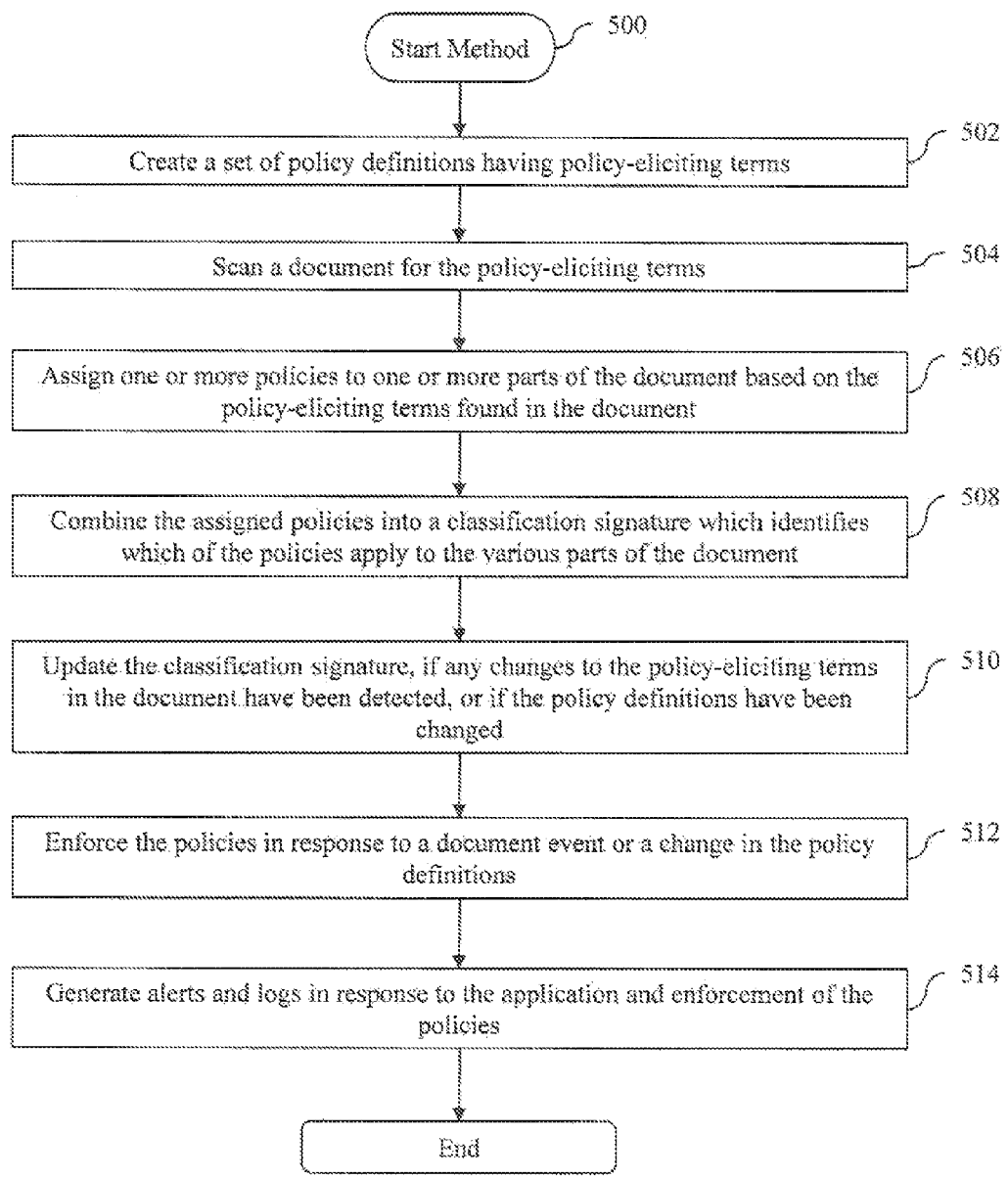
FIG. 5 is a flowchart of one example of a method for document policy enforcement.

FIG. 5 is a flowchart of one example of a method 500 for document policy enforcement. Those skilled in the art will recognize that while one example of the present invention's method is now discussed, the material in this specification can be combined in a variety of ways to yield other examples as well. The method next discussed is to be understood within a context provided by this and other portions of this detailed description.

The method 500 begins in block 502, by creating a set of policy definitions 202, wherein the policy definitions 202 include: a set of policies 204; a set of policy-eliciting terms (PETs) 206; a set of user identifiers 208; a permitted set of actions 210; a denied set of actions 212; a set of modification actions 214, and a set of alerts and logs 216.

Next, in block 504, scan a set of predetermined structured and/or unstructured fields within a document for the policy-eliciting terms 206. In Hock 506, assign policies 204 to parts of the document based on the policy-eliciting terms 206 found in each part of the document.

Then in block 508, the assigned policies 204 are combined into a classification signature 302 which identifies which of the policies 204 apply to the various parts 304 of the document. In block 510, the classification signature 302 is updated if any changes to the policy-eliciting terms 206 in one or more document parts 304 have been detected, or if the policy definitions 202 have been changed by the policy editor 112.

Next in block 512, the policies 204, the permitted actions 210, the denied actions 212, and the modification actions 214 are applied and enforced, in response to a document event or change in the policy definitions 202. Then in block 514, alerts and logs 216 are generated in response to the application and enforcement of the policies 204.

As used herein and in the claims, the following words are defined as follows:

"Policies" are also created to address and/or manage a variety of resources. For example, a policy can be a set of configuration instructions used to set-up a computer, network protocols, or a set of applications. Policies can further determine what information resources users can access and the kinds of applications they can install on their computers.

The term "cloud" is a computer network accessible over the internet and/or web that is dynamically scalable with virtualized resources, such as printing resources. The cloud may be physically distributed, but is not required to be so. Users are not required to have knowledge or expertise in the infrastructure of the cloud that relies on the internet to satisfy the computing or printing needs of users. The cloud provides computer and/or printing device services with business applications that are accessible from a web browser white software and data are stored on servers in the cloud. For example, a printing cloud system supports infrastructure for printing device services, platform for the printing device services, and software for the printing device services.

The term "printing device" is an electronic device that performs one or more functions of printing, scanning, and copying. In one embodiment, a printing device is a printer. A printing device, however, is not limited to printers, but includes other devices, such as a scanner, a copier, a machine with facsimile operations, and/or a multi-functional device that performs two or more functions of printing, scanning, copying, and faxing.

The term "web-enabled" printing device is a printing device that is accessed to print/copy/scan documents over the web.

The term "world wide web" or "web" is a system of linked hypertext documents access through the internet. Using a web browser, a user can view web pages that include text, images, video, and other media and navigate between these pages with hyperlinks.

The term "printer" is not limited to just standard printers, but includes various other types of electronic devices that perform one or more functions such as printing, scanning, or copying.

The term "file" or "a set of files" refers to any collection of files, such as a directory of files. A "tile" can refer to any data object a document, a bitmap, an image, an audio clip, a video clip, software source code, software executable code, etc.). A "file" can also refer to a directory (a. structure that contains other tiles).

Functional and software instructions described above are typically embodied. as a set of executable instructions which are effected on a computer which is programmed with and controlled by said executable instructions. Such instructions are loaded for execution on a processor (such as one or more CPUs). The processor includes microprocessors, microcontrollers, processor modules or subsystems (including one or more microprocessors or microcontrollers), or other control or computing devices. A "processor" can refer to a single component or to plural components In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. An article comprising:
    at least one tangible, non-transitory computer-readable storage medium containing executable computer instructions for document policy enforcement, including:
        executable computer instruction for detecting a document event selected from the group consisting of: i) when the document is opened, edited, modified, copied, pasted, saved, archived, deleted, transmitted, exported, printed, burned to DVD, or backed-up; ii) when a new record is added to the document; iii) upon receiving a request to audit the document; and iv) when a policy has been changed;
        executable computer instruction for performing, in response to the detected document event, deep content parsing of parts of the document for a set of policy-eliciting terms and for any policy-eliciting terms that are not in the set;
        executable computer instruction for assigning a policy to at least one of the parts of the document based on a policy-eliciting term found within the at least one of the parts of the document; and
        executable computer instructions for enforcing the assigned policy.

2. The article of claim 1 wherein the policy-eliciting term found within the at least one of the parts of the document is one from a group including: a classification level, a security label, a word, a paragraph, a page, a form, a template, a number, a symbol, a phrase, a pattern, data, a tag, a date, a logo, a code, computer code, a file, a record, a part of a copyrighted work, a product name, and wherein the at least one of the parts of the document further includes an other policy-eliciting term having: an error, a linguistic variation, a letter case variation, a plural form, and a regular expression.

3. The article of claim 1, wherein the executable computer instructions for performing deep content parsing further include:
    executable computer instructions for scanning, within the document, a structured field, an unstructured field, a document header, a document footer, a document body, document metadata, a predefined set of document pages, a predefined set of document slides, and combinations thereof.

4. The article of claim 1 wherein the assigned policy includes one from a group including: a permitted set of actions; a denied set of actions; a set of modification actions; and a set of alerts and logs.

5. The article of claim 4 wherein the actions include one from a group including: rights to copy, duplicate, save, encrypt, export, print, and e-mail the document part; and rules for effecting the aforementioned document part rights.

6. The article of claim 1 wherein the executable computer instructions for assigning include:
    executable computer instructions for assigning the policy to the at least one of the parts of the document based on a user identifier;
    wherein the user identifier identifies one from a group including: a user, a class of users, a user role, an individual, a network service, and a program.

7. The article of claim 1 wherein a plurality of policies are respectively assigned to a plurality of the parts of the document, and wherein the executable computer instructions for assigning the policy further comprise:

recording the assigned plurality of policies in a classification signature, thereby identifying which of the assigned plurality of policies is applied to each of the plurality of the parts.

8. A system for document polity enforcement, comprising:
a computer programmed with executable instructions which operate a set of modules, wherein the modules comprise:
  a policy editor for:
    generating a policy: and
    associating the generated polity with a set of policy-eliciting terms; and
  a policy daemon for:
    detecting a document event selected from the group consisting of: i) when the document is opened, edited, modified, copied, pasted, saved, archived, deleted, transmitted, exported, printed, burned to DVD, or backed-up; ii) when a new record is added to the document; iii) upon receiving a request to audit the document; and iv) when the generated polity has been changed;
    performing, in response to the detected document event, deep content parsing of parts of the document for the set of policy-eliciting terms and for any policy-eliciting terms that are not in the set;
    dynamically assigning a policy to at least one of the parts of the document based on a policy-eliciting term found within the at least one of the parts of the document; and
    enforcing the assigned policy.

9. The system of claim 8, further comprising:
  a local system, including an instance of the policy daemon;
  a policy server, including the policy editor, and a policy repository for storing policies; and
  a document repository for storing the parts of the document.

10. The system of claim 9 wherein the local system is one from a group including: a printer, a mobile device, and a desktop computer.

11. A method, effected by a computer programmed with executable instructions, for document policy enforcement, comprising:
  detecting a document event selected from the group consisting of: i) when the document is opened, edited, modified, copied, pasted, saved, archived, detected, transmitted, exported, printed, burned to DVD, or backed-up; ii) when a new record is added to the document; iii) upon receiving a request to audit the document; and iv) when a policy has been changed;
  in response to the detected document event, performing deep content parsing of parts of the document for a set of policy-eliciting terms for any policy-eliciting terms that are not in the set;
  assigning a policy to at least one of the parts of the document based on a policy-eliciting term found within the at least one of the document parts; and
  enforcing the assigned policy.

12. The method of claim 11 wherein the assigned policy includes one from a group including: a permitted set of actions; a denied set of actions; a set of modification actions; and a set of alerts and logs.

* * * * *

UNITED STATES PATENT AND TRADEMARK OFFICE
CERTIFICATE OF CORRECTION

PATENT NO. : 8,943,603 B2
APPLICATION NO. : 13/700804
DATED : January 27, 2015
INVENTOR(S) : Steven J. Simske et al.

It is certified that error appears in the above-identified patent and that said Letters Patent is hereby corrected as shown below:

In the Claims

In column 10, line 7, in Claim 1, delete "instruction" and insert -- instructions --, therefor.

In column 10, line 15 approx., in Claim 1, delete "instruction" and insert -- instructions --, therefor.

In column 10, line 21, in Claim 1, delete "instruction" and insert -- instructions --, therefor.

In column 11, line 5, in Claim 8, delete "polity" and insert -- policy --, therefor.

In column 11, line 10, in Claim 8, delete "policy;" and insert -- policy: --, therefor.

In column 11, line 11, in Claim 8, delete "'polity" and insert -- policy --, therefor.

In column 11, line 22, in Claim 8, delete "polity" and insert -- policy --, therefor.

In column 12, line 14, in Claim 11, delete "detected," and insert -- deleted, --, therefor.

In column 12, line 21, in Claim 11, delete "for" and insert -- and for --, therefor.

Signed and Sealed this
Twenty-sixth Day of May, 2015

Michelle K. Lee
*Director of the United States Patent and Trademark Office*